Nov. 5, 1968  H. W. THYLEFORS  3,409,214
DEVICE FOR INDICATING THE SLUDGE LEVEL IN SLUDGE CENTRIFUGES
Filed Oct. 18, 1966
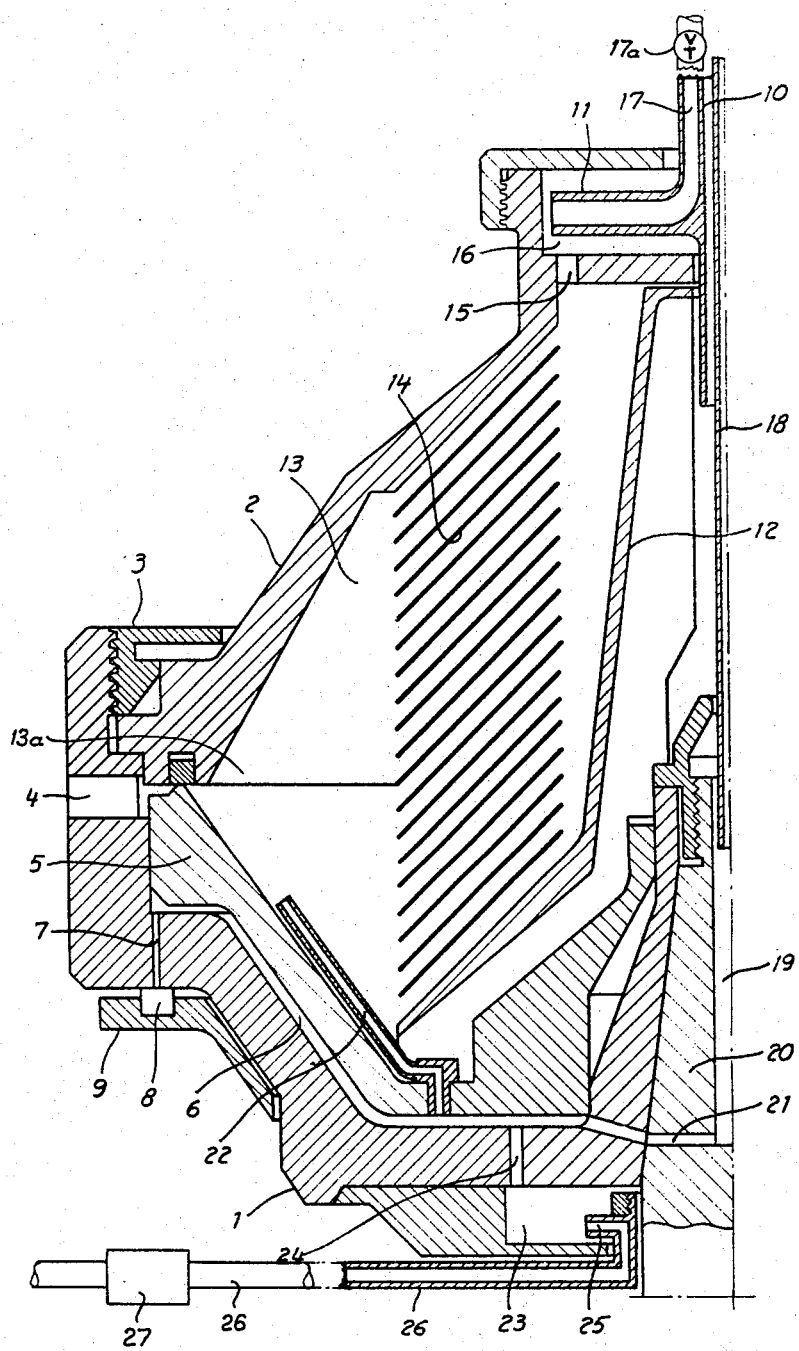
INVENTOR.
HENRIC WILHELM THYLEFORS
BY
Davis, Hoxie, Faithfull & Hapgood
ATTORNEYS.

United States Patent Office 3,409,214
Patented Nov. 5, 1968

3,409,214
DEVICE FOR INDICATING THE SLUDGE LEVEL IN SLUDGE CENTRIFUGES
Henric Wilhelm Thylefors, Stockholm, Sweden, assignor to Alfa-Laval AB, Tumba, Sweden, a corporation of Sweden
Filed Oct. 18, 1966, Ser. No. 587,594
Claims priority, application Sweden, Oct. 26, 1965, 13,779/65
4 Claims. (Cl. 233—19)

ABSTRACT OF THE DISCLOSURE

A paring member forms an outlet for separated liquid and has an edge for paring such liquid from the centrifugal rotor; and there is a device for indicating the level of sludge in the sludge-collecting space of the rotor, this device comprising a liquid level sensing means positioned to sense a liquid level located nearer the rotation axis than is said paring edge, the rotor having a channel extending radially inward from said sludge space to said liquid level sensing means, the rotor also having a liquid inlet leading to the radially inner end portion of said channel, and an adjustable throttle in said outlet of the paring member.

---

The present invention relates to a device for indicating the sludge level in the sludge space of the rotor in sludge centrifuges. It relates more particularly to such centrifuges of the type in which the rotor has an inlet for the liquid to be separated, an outlet in the form of a paring member for separated liquid, a peripheral outlet for separated sludge, and a channel which connects the sludge space of the rotor to a liquid level sensing means arranged to sense a level located nearer the axis of rotation than the paring edge of the paring member.

Such a sensing device is known through German publication specification No. 1,173,030 and the corresponding U.S. Patent No. 3,301,476 dated Jan. 31, 1967. In this prior device, the sensing of the sludge level takes place with a certain sluggishness, since the liquid level to be sensed must be displaced a relatively large distance in radial direction before a sufficient impulse is obtained. The prior device has the further drawback that the position of the liquid level to be displaced, when sludge has collected in the sludge space in a quantity sufficient for discharge, is also dependent on factors such as the flow rate of liquid to be separated. A large flow rate gives, without sludge deposition, the same impulse as that given by sludge deposition at a more moderate flow rate.

The present invention has for an object the provision of means to effect a rapid indication which is independent of the rate of the flow of liquid to be separated and which indicates when the liquid level reaches the predetermined position.

According to the present invention, the indicating device referred to above is also provided with a liquid inlet which leads to the radially inner end of the channel, and the outlet of the paring member is provided with a controllable throttling device.

The liquid level sensing means of the invention can be a simple overflow outlet, a liquid flow through this outlet indicating that the predetermined sludge level has been reached. Alternatively, the level sensing means can be a paring member. This alternative makes it possible to insert, in the outlet duct of the paring member, a pressure or flow sensing means, the deviation of which indicates that the predetermined sludge level has been reached. It is then possible, in automatic self-discharging sludge centrifuges, to arrange the pressure or flow sensing means to effect sludge discharge automatically.

The invention will now be explained more in detail, reference being made to the accompanying drawing in which the single illustration is an axial sectional view of an upright centrifuge.

In the drawing, the rotor body 1 of the centrifuge has a cover 2 secured by a threaded ring 3. The wall of the rotor body is provided with sludge outlet openings 4, which are opened and closed by a vertically movable valve piston 5. The latter is kept in closed position by liquid contained in a space 6 between the underside of the piston 5 and the rotor bottom. This liquid, under the influence of the centrifugal force, presses the piston 5 upwards. The rotor bottom has holes 7 which are closed by pads 8 carried by a ring valve 9. The valve 9 is pressed upwards by springs (not shown) to close the holes 7.

Sludge-containing liquid to be separated is supplied through a stationary inlet pipe 10, which is surrounded concentrically by a stationary paring disk 11. Liquid entering the rotor from pipe 10 flows downward through a distributor 12 into the separating space 13 of the rotor, in which space there is a conical disk set 14. Separated sludge collects at the periphery of the separating space, in the so-called sludge space 13a, while separated liquid passes from the inner edge of the disk set 14 through a hole 15 to a paring chamber 16 and is discharged from the latter by the paring disk 11. An adjustable throttling valve 17a is inserted in the outlet channel 17 of the paring disk, or in a duct connected thereto. Liquid is supplied through a stationary pipe 18, inserted in the pipe 10 and concentric thereto, and is allowed to mix with the liquid to be separated. That is, the liquid from pipe 18 flows downwardly into an axial channel 19 in the shaft 20, which carries and drives the rotor, and from there flows into a channel 21 which opens into the space 6. The liquid flows from space 6 to the sludge space 13a through a pipe 22 and mixes with the liquid to be separated.

The rotor bottom has a paring chamber 23, which is also connected to the space 6 through a channel 24. In the chamber 23 is a stationary paring disk 25 having an outlet duct 26, in which a conventional pressure or flow sensing means 27 is inserted.

The device operates in the following manner:

During the separation, there is formed a liquid level which is substantially the same in the paring chamber 16, the separating chamber 13, and the paring chamber 23, since all these chambers communicate with each other through channels filled with liquid. Before any substantial sludge separation has taken place, the outlet of the paring disk 11 is throttled by means of the valve 17a in the outlet 17 so that the liquid level in the chamber 23 moves radially inward and covers the paring edge of the paring disk 25. Liquid then starts discharging through the duct 26. The throttling of the outlet valve 17a is then decreased slowly to the point that the discharge of liquid through the duct 26 just ceases. At that point, the liquid level in the chamber 23 will be situated just outside the opening of the paring disk 25.

When separated sludge has reached a level at the opening of the pipe 22 in the sludge space, this opening is obstructed and liquid flowing from the pipe 18 causes the liquid level in chamber 23 to move radially inward toward the axis of rotation and to cover the opening of the paring disk 25. As soon as this takes place, pared liquid discharges through the duct 26, indicating that the sludge collected in the centrifuge should be discharged. Such discharge may be effected manually or automatically by actuating the ring valve 9 downward against the force biasing it upward, whereby liquid drains from space 6 through holes 7 to allow downward movement of valve piston 5 under the pressure of the material in separating space 13. When valve piston 5 is to be returned to its closing position, ring valve 9 is released to block the holes 7 so that space 6 is again filled with liquid to raise the piston 5.

As previously mentioned, duct 26 is preferably provided with a conventional pressure or flow sensing means 27 for giving a signal in response to discharge through this duct, and such signal may be used for automatic operation of means conventionally employed to lower the ring valve 9.

I claim:

1. In combination with a sludge centrifuge comprising a centrifugal rotor having an inlet for sludge-containing liquid to be separated and forming a separating space communicating with said inlet, the rotor also having a peripheral sludge space for receiving separated sludge, and a paring member forming an outlet for separated liquid and having an edge for paring separated liquid from the rotor; a device for indicating the sludge level in the sludge space, said device comprising a liquid level sensing means positioned to sense a liquid level located nearer the rotation axis of the rotor than is said paring edge, the rotor having a channel extending generally radially inward from said sludge space to said liquid level sensing means, the rotor also having a liquid inlet leading to the radially inner end portion of said channel, and an adjustable throttle in said outlet of the paring member.

2. The combination according to claim 1, in which said liquid level sensing means is a second paring member.

3. The combination according to claim 1, comprising also a flow sensing means operatively connected to said level sensing means and responsive to a liquid level sensed by the level sensing means.

4. The combination according to claim 1, comprising also a duct for continuously feeding liquid to said inlet leading to the radially inner end portion of the channel, whereby said last liquid passes freely into the sludge space until the outer end of the channel is obstructed by sludge, whereupon the level of said last liquid in the channel increases inwardly to the liquid level sensing means.

References Cited

UNITED STATES PATENTS

| | | | |
|---|---|---|---|
| 3,189,267 | 6/1965 | Thylefors | 233—20 |
| 3,272,430 | 9/1966 | Thylefors | 233—20 |
| 3,167,509 | 1/1965 | Steinacker | 233—20 |
| 3,301,476 | 1/1967 | Hemfort | 233—20 |
| 2,378,778 | 6/1945 | Lindgren et al. | 233—20 |
| 2,958,462 | 11/1960 | Wicklund | 233—45 |

HENRY T. KLINKSIEK, *Primary Examiner.*